US010772269B2

(12) United States Patent
Fleming et al.

(10) Patent No.: US 10,772,269 B2
(45) Date of Patent: Sep. 15, 2020

(54) PREDICTING CROP PRODUCTIVITY VIA INTERVENTION PLANNING ON SMALL-SCALE FARMS

(71) Applicant: INTERNATIONAL BUSINIESS MACHINES CORPORATION, Armonk, NY (US)

(72) Inventors: Kala K. Fleming, Nairobi (KE); Elizabeth A. Ondula, Nairobi (KE); Lianna Samuel, San Jose, CA (US); Komminist S. Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/246,773

(22) Filed: Aug. 25, 2016

(65) Prior Publication Data
US 2018/0059691 A1 Mar. 1, 2018

(51) Int. Cl.
*A01G 25/16* (2006.01)
*G06Q 50/02* (2012.01)
*G05B 19/042* (2006.01)

(52) U.S. Cl.
CPC ....... *A01G 25/167* (2013.01); *G05B 19/0426* (2013.01); *G06Q 50/02* (2013.01); *G05B 2219/25419* (2013.01); *G05B 2219/2625* (2013.01)

(58) Field of Classification Search
None
See application file for complete search history.

(56) References Cited

U.S. PATENT DOCUMENTS

| 8,793,024 | B1* | 7/2014 | Woytowitz | A01G 25/167 137/78.2 |
| 2003/0018431 | A1* | 1/2003 | Hanson | A01B 79/005 702/5 |
| 2009/0216345 | A1* | 8/2009 | Christfort | G05B 19/0428 700/21 |
| 2010/0268390 | A1* | 10/2010 | Anderson | A01G 25/167 700/284 |
| 2013/0162390 | A1* | 6/2013 | Ersavas | A01G 25/16 340/3.1 |
| 2013/0174040 | A1* | 7/2013 | Johnson | G06Q 10/06 715/733 |

(Continued)

OTHER PUBLICATIONS

Irmak, Suat; Odhiambo, Lameck O.; Kranz, William L.; and Eisenhauer, Dean E., "Irrigation Efficiency and Uniformity, and Crop Water Use Efficiency" (2011). Biological Systems Engineering: Papers and Publications. 451. (Year: 2011).*

*Primary Examiner* — Kenneth M Lo
*Assistant Examiner* — Istiaque Ahmed
(74) *Attorney, Agent, or Firm* — Shimon Benjamin; Otterstedt, Wallace & Kammer, LLP

(57) ABSTRACT

The disclosure provides systems and methods for monitoring and managing crops. Crop selection, planting, growth, and harvest are monitored based on sensor input as well as contextual information, allowing automated decisions and actions that increase efficiency at every stage of the farming process. Contextual information includes historical crop information and other statistics pertaining to a specific location under cultivation. Improved farm output and efficient use of resources are key results using the systems and methods.

24 Claims, 4 Drawing Sheets

(56) References Cited

U.S. PATENT DOCUMENTS

| | | | |
|---|---|---|---|
| 2014/0230391 A1* | 8/2014 | Hendrickson | G01N 33/0098 56/10.2 R |
| 2014/0371928 A1* | 12/2014 | Ersavas | A01G 25/167 700/284 |
| 2016/0202227 A1* | 7/2016 | Mathur | G06Q 50/02 702/2 |

* cited by examiner

PREDICTING CROP PRODUCTIVITY VIA INTERVENTION PLANNING ON SMALL-SCALE FARMS

FIELD OF THE INVENTION

In embodiments, the technical field of the invention is methods and systems for monitoring and managing crops.

BACKGROUND

In emerging markets such as those across sub-Saharan Africa, 80% of the food is grown on small-scale farms. Many of these farms are between 1 to 5 acres in size, are rain fed and have the lowest productivity among developing economies. Due to small size and significant involvement on manual labor, innovative approaches are required to boost agricultural productivity of farming in sub-Saharan Africa. There is ample evidence to suggest that the low productivity in rain-fed agriculture is due more to suboptimal performance related to management aspects rather than to low physical potential of agricultural lands.

Farming on Small Scale Typically Involves Three Steps:

(1) Land and crop selection. The typical small-scale farmer has two or more different types of crops on his farm with different water and nutritional requirements. The distribution of soil, water, mineral and pH varies given how the land is divided. S/he must ensure the best crops are selected for that location, and that water is optimally applied.

(2) Growth monitoring and maintenance. After selecting the crop, the farmer needs to ensure optimal growth conditions are maintained. Ensuring reliable water supply is essential. The farmer needs to be alerted if the supply is low or if the water delivery to the root zone of the plant is sub-optimal. The farmer also needs to know how inputs, especially, translate to knowing the health status of a certain crop in the farm. In developing countries, simple, low cost and intuitive monitoring approaches are needed to deliver these insights. Remote sensing approaches will often not work for the small-scale farm given size relative to what can be inferred from remote imagery.

(3) Harvesting. When the crops are ready for harvest the farmer faces weather, pest and market access constraints. S/he would benefit by receiving early warning on these potential pitfalls.

SUMMARY OF THE INVENTION

A goal of this invention is to intelligently determine crop productivity if sensory and non-sensory data are available and efficient farm intervention strategies are applied. Various challenges posed by this problem and overcome in part or in whole by the disclosed methods/systems are: dynamic detection of the water deficiency of an individual crop in a given small scale farm and measuring its water stress pattern; determination of how likely the crop heath status changes given a crop's current state of water usage and water point predicted reliability value, and ability to predict crop productivity; dynamically deciding whether to intervene a crop, group of crops (or part of the farm) based on their risk level computed from predicted farm productivity score and other context information; given static and dynamic stream data, as well as computed values (e.g., difference of the expected productivity and predicted productivity), intelligently generate optimal farm intervention plans; demonstrably reduce small-scale farming water management and overall operating costs; demonstrably reduce variability in farm outputs; and demonstrably increase farm profits.

In an aspect, then, is a method for managing crop production, the method comprising: determining a water point reliability index for a location from a data hub, the data hub comprising water sensor data pertaining to a water level at a location, soil sensor data pertaining to a soil condition at the location, farmer profile data pertaining to a farmer at the location, and context data; determining a crop health index for the location from the data hub; determining a productivity index for the location from the data hub; determining an intervention plan based on the water point reliability index, crop health index, and productivity index; initiating the intervention plan, the initiating comprising an action selected from: transmitting an alert to a user device and displaying the alert on the user device; initiating an interactive service on the user device; altering a user interface to display an alert; and initiating an automated irrigation scheduler at the location. In embodiments:

the context data is data pertaining to a weather pattern information, disease pattern information, cohort of the farmer and the farm, etc.;

the location is a farm, the water sensor data corresponds to a water level in a water storage tank, and the soil sensor data corresponds to a soil moisture level;

the method further comprises receiving the water sensor data, soil sensor data, and farmer profile data, and aggregating the received data to form the data hub;

the method further comprises receiving non-sensory data (such as farmer profile data, weather reports, etc.) pertaining to the location or to the farmer;

the intervention plan is selected to maximize the productivity index;

the intervention plan comprises a crop yield prediction, and the action is selected based on the crop yield prediction;

the data hub further comprises a plurality of plant health indices, each plant health index pertaining to an individual plant, and wherein the crop health index is based on the plurality of plant health indices;

the data hub further comprises a plurality of plant health indices, and wherein the plurality of plant health indices are calculated from the soil sensor data in the data hub;

the data hub further comprises a plurality of plant health indices, each plant health index pertaining to an individual crop or pertaining to a group of crops showing similarity in their health pattern;

the data hub further comprises soil sensor data pertaining to a second location adjacent to the location;

the farmer profile data comprises data selected from an age, education level, gender, farming history, and access to infrastructure; and the data hub further comprises data pertaining to the location, the data comprising soil type, soil pH, crop history, elevation, and GPS coordinates.

In an aspect is a method for managing crop production, the method comprising: receiving, by a server, water sensor data from a water sensor at a location, and storing the water sensor data in a data hub; receiving by the server soil sensor data from a soil sensor at the location and storing the soil sensor data in the data hub; receiving by the server profile data selected from profile data pertaining to the location or profile data pertaining to a farmer associated with the location, and storing the profile data in the data hub; determining, based on the contents of the data hub, a water point reliability index and a crop health index for the location; determining a productivity index based on the water point reliability index and the crop health index;

determining and initiating an action based on the productivity index, the action selected from: transmitting an alert to a device and displaying the alert on the device; initiating an interactive service on a device; and initiating an automated dispensing device at the location. In embodiments:

the action is a component of an intervention plan, the intervention plan comprising a plurality of action;

the method further comprises receiving plant identification data and storing the plant identification data in the data hub, and further comprising determining a plurality of plant health indices from the soil sensor data, the plant identification data and context data;

the context data is weather data and plant health data, or the like;

the method further comprises predicting an event pertaining to the location based on the data hub, wherein the event is predicted to affect a future productivity index for the location, and wherein the action is determined based on the predicted event; and the profile data is farmer profile data comprising historical data pertaining to productivity of the location.

In an aspect is a method for managing crop production at a farm, the method comprising: determining by a server, based on real time farm-level sensory data pertaining to soil moisture and water point reliability, an intervention plan for improving productivity and crop health at the farm; implementing by the server the intervention plan, wherein the intervention plan comprises at least one action selected from the following actions: transmitting an alert to a user device and displaying the alert on the user device, wherein the user device is located on the farm; initiating an interactive service on the user device; altering a user interface to display an alert, wherein the user interface is located on the user device or at the server; and initiating an automated irrigation scheduler at the farm.

In an aspect is a system comprising: a processor; and a memory coupled to the processor, the memory configured to store program instructions for instructing the processor to carry out any of the methods as above. In embodiments:

the system further comprises a communication component configured to receive data from a water sensor and a soil sensor; and the system further comprises a water sensor and a soil sensor positioned at the location, wherein the processor is configured to communicate with the water sensor and soil sensor via a network.

These and other aspects of the invention will be apparent to one of skill in the art from the description provided herein, including the examples and claims.

DETAILED DESCRIPTION OF VARIOUS EMBODIMENTS

Figure 1:
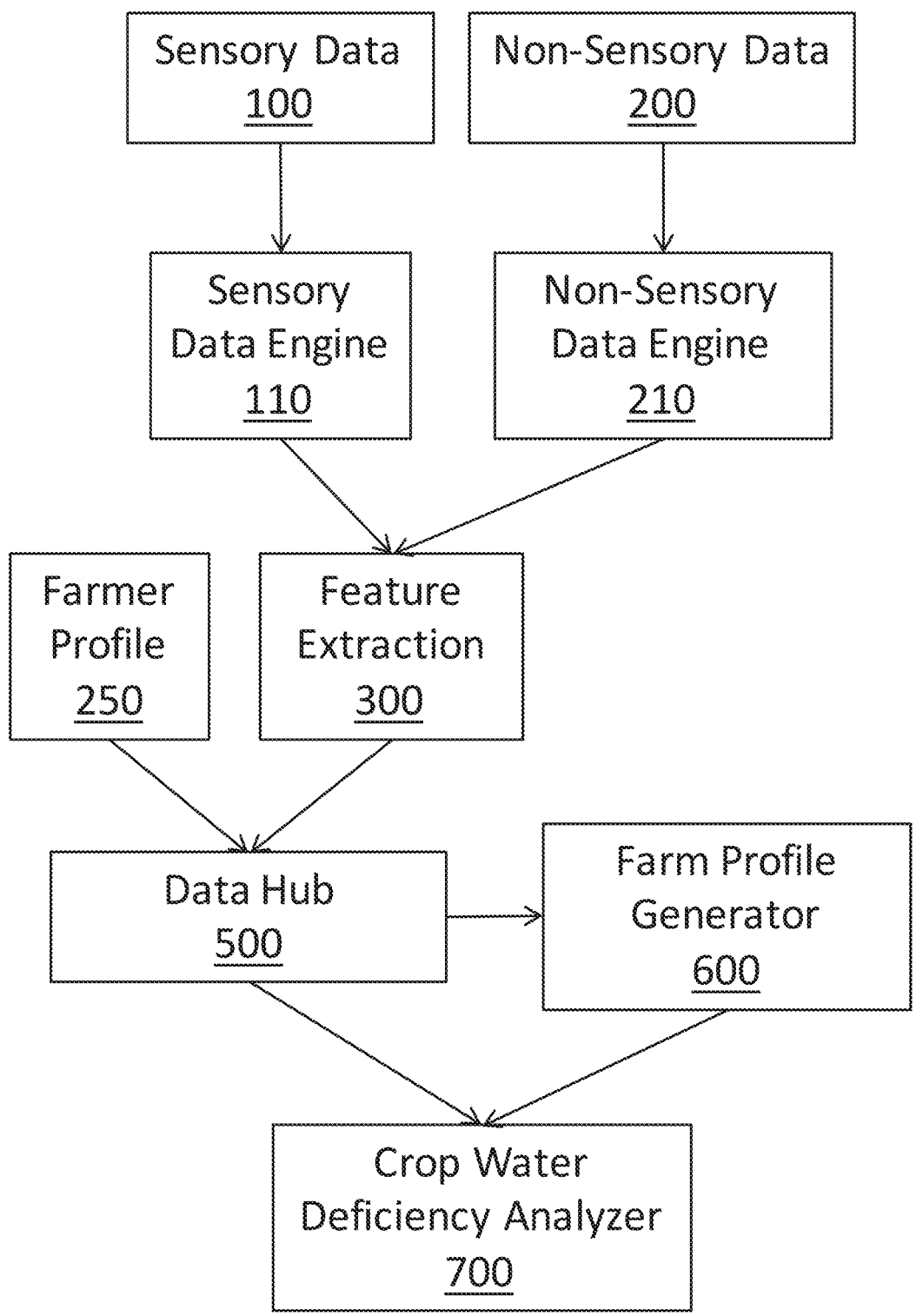
FIG. 1 provides a flowchart showing collection of data and formation of a data hub according to an embodiment of the invention.

One key step for improving farm productivity is to remove the potential for water deficiencies, especially in arid and semi arid lands, and to provide more intuitive tools for overall farm management. Similarly, by digitizing a small-scale farm along with its water resources, continuous monitoring is enabled and interventions can be introduced as needed to ensure a productive growing season.

Adopting technology-led small-scale farming provides many benefits, and is greatly aided by low-cost sensor technology, penetration of mobile phone/devices, low-cost network technologies (e.g., LORA® Alliance), the Internet of Things (IoT) initiatives, etc.

To simplify farm management in resource constrained environments, the digitization of a small-scale farm is the core of this invention, wherein sensors and computing technologies (e.g., mobile, circuits such as Raspberry Pi, Lora, etc.) are used to create a digital representation of a farm. Such digitized farms provide a number of benefits to individual farmers, aggregators, investors, etc., including: monitoring the crop lifecycle for early warnings on crop water deficits and poor crop health; building various analytics models to determine farm productivity; and generating and applying intervention strategies, among other benefits.

The approach provided herein uniquely utilizes low cost sensors together with plant health based models to help individual farmers or aggregators in making intelligent decisions of farm productivity, with relevant farm intervention strategies based on predicted farm productivity. The methods and systems are novel combinations of predicted crop water deficits, water point reliability scores, and context information to determine crop productivity, and generate and enable farm interventions with low-cost delivery techniques, among other advantages.

In an aspect, then, is a method for predicting small-scale farm productivity under resource constrained environment using plant health index and water reliability index of low-cost distributed irrigation systems, comprising constructing a farm knowledge data hub from a plurality of sensory and non-sensory data sources; creating an interlinked knowledge representation infrastructure that allowing the development of various descriptive (e.g. water consumption patterns, plant heath pattern, farm condition, time-series analysis events, etc.) and predictive (e.g., predicting crop yield, crop market readiness, "cause-effect" irrigation scheduling, plant stress prediction, predict soil degradation, predication of pH level, etc.) models; updating the farm knowledge data hub from continuous data points; computing a water point reliability index using water level sensor data, computing a plant health score from a plurality of sensory and non-sensory data sources; aggregating plant heath scores into an overall plant health score between individual plants in order to form a farm level health score; aligning at least one similar plant based on a plant stress and a time dimension; and predicting a productivity outcome measure of a plant/farm based on at least one similar plant. In embodiments, the system and method involves distributed collection of farm contextual data. In embodiments the system and method involves generating plant health index and irrigation alerts. In embodiments, the system and method uses patterns from soil moisture sensing signals to infer plant health and detect plant stress. In embodiments the system and method involves predicting farm productivity using plant health index.

In an aspect, is a method comprising generating a set of farm interventions linked to water management that optimizes small scale farm productivity by maximizing crop health ($H_{max}$), minimizing the crop water deficit ($D_{min}$) and maximizing the water point reliability ($R_{max}$) of low-cost distributed irrigation systems. The method enables determination of crop health index (H) using sensory and non-sensory data in an effort to achieve optimal, dynamic farm productivity and farm intervention creation and coordination.

In embodiments, the systems and methods involve aggregating farm-level sensor data using a farm instrumentation engine (also referred to as a sensory data engine) to continuously or periodically receive sensed and transmitted soil moisture data and water level data, as well as additional metadata. The data is collected via sensors, and transmitted from the sensors to the sensory data engine via a farm level gateway (all of which are described in more detail herein). In embodiments, the sensors and sensory data engine use of-the-shelf technologies in order to reduce complexity and increase serviceability of the system. In embodiments, the sensory data engine is located on a server (i.e., on the cloud, remote from the farm and the farm-level components). Prior to the server receiving the sensory data, a variety of data capture, storage, and processing steps may be involved, such as those described below.

For example, a soil moisture sensor (SMS) can be used to read an instant soil moisture level (i.e., raw soil moisture value, along with a timestamp as metadata). The data is pushed to a farm level gateway (FG) in a defined time interval (e.g. 5, 10, 15, 20, 25, or 30 second intervals). The data may further include identification data such as a sensor ID or a GPS location of the sensor. The data may be stored locally on the soil moisture sensor and transmitted in bulk to the FG, or may be transmitted with each reading such that no local storage is necessary.

Also for example, a water level sensor (WLS) is installed on any water storage tank at the farm. The WLS measures the instantaneous amount of water stored in a tank. The data is represented by: current water level within the tank, percentage of the total depth of the tank, and/or volume, as well as a timestamp as metadata. In some embodiments the WLS may return a simple binary value depending on whether the water level is good (i.e., above a predetermined level) or not good (i.e., below a predetermined level). The WLS may also provide identifying data such as a sensor ID or a GPS location of the sensor (and therefore of the water tank in which it is installed).

In embodiments, soil pH can also be measured via a pH sensor placed in the soil (either permanently or temporarily, and either in a fixed location or such that the location of the pH sensor can be moved as needed). The pH sensor can also be a component of a combination pH and soil moisture sensor.

The farm level gateway (FG) is a component that directly receives sensor data from WLSs and SMSs on a farm. The FG communicates with the sensors via a radio network or any other suitable network and networking protocol, such as radio frequency (RF) communication, WiFi, WiMAX, Bluetooth, 3G, 4G, and the like. Depending on the means of communication and the land area of the farm, more than one FG may be required to ensure all sensors are connected to the system. In embodiments, the FG is based on the Raspberry Pi technology (an off the shelf technology), thereby allowing the FG to process raw sensory readings, aggregate and summarize the data as needed, and sync with cloud backend through the IoT Foundation APIs (e.g., MQTT). The FG may communicate with the server (i.e., cloud-based backend support components of the system herein) via any suitable communications system and protocol, particularly such as 3G, 4G, WiFi, and the like. In embodiments, the WLS and SMS may have a backup communications option—e.g., 3G communication directly with the server, thereby bypassing the FG—in the event that the FG becomes inoperable or is otherwise unavailable.

In embodiments, the systems and methods involve collection of non-sensory data using a non-sensory data engine. This engine is a set of APIs to collect and integrate other data sources such as historical or single-instance pH readings of the soil, soil type, satellite images, weather information, plant databases, farm profile (e.g., terrain, topography, elevation, services provided such as electricity, availability of labour, etc.), farmer profile (e.g., training and skills, experience, etc.) and other contextual data. The non-sensory data acquisition engine can obtain such information from any suitable source, including: a mobile app to manually insert the pH of the soil and soil type as measured by any suitable device/system; websites providing plant databases, general plant information, and ontology; websites providing weather and satellite imagery among other information; off-line sources such as DVDs and other data storage devices; satellite image acquisition software (e.g., the Physical Analytics Integrated Repository and Services (PAIRS) platform, and a suitable PAIRS application program interface, wherein PAIRS is a system that enables acquiring images of a farm as well as soil moisture and other weather parameters from satellite data at regular intervals, or an equivalent system)); public and private weather reporting systems via suitable APIs (e.g., online systems such as PAIRS, Weather Underground, and Deep Thunder); and market related data via public and private market information systems (e.g., crop futures market data). The non-sensory data engine is located on the server (i.e., remote from the farm-level components of the system).

In embodiments, data from the sensory data engine, non-sensory data engine and potentially other sources (e.g., farmer profile data, although such data may also be processed by the non-sensory data engine) are collected in a data hub located on a server. The process of creating the data hub involves extraction of desired features (e.g., static and dynamic features) from the various multiple sensory and non-sensory input sources, aggregating, and then linking the data with other data points of similar context. These processes are described in more detail below.

In embodiments, a feature extraction module interfaces with multiple data collection systems (e.g., the sensory data engine and non-sensory data engine) to receive and extract static and dynamic information about the farm from the received data. Such information may be in the form of signals, text, and images about the farm. Examples of extracted information include information pertaining to water (e.g., availability, usage and consumption), soil, crop growth and heath, weather, and the like, along with relevant metadata information. The feature extraction module is located on the server (i.e., remote from the farm-level components of the systems herein). Similarly, an image analytics module can be present on the server to extract and aggregate other data captured from mobile and satellite sources. Such extracted and aggregated information can be tagged with metadata (time and location stamps) and added to the data hub as appropriate. Such updates can be done continuously or periodically according to an appropriate schedule. The images can be analysed, e.g. to provide information of the covered area of the farm and for farm profiling (as per the requirement of the farm profile generator).

In embodiments, an aggregator & linker module is present to validate the incoming data from the feature extraction module and aggregate into a single representation format by dynamically linking with the relevant metadata, sensory data, and additional contextual data. The aggregation and linking process can use domain ontology to create (and continuously update) the data hub.

The result of the above processes is a data hub containing sensor and non-sensor data pertaining to farm locations throughout a region. The data hub is a database on the server, remote from the farms and farm-level components of the systems herein, but in communication with such devices via a network.

Organization of the data hub can follow any convenient scheme. For example, similarity/clustering algorithms can be used to cluster similar plants in the data hub, the similarity being based on qualitative factors such as sensor measurements, demographics, weather, etc. as well as farmer's assessment of the crop type and best practices encoded in the domain knowledge within the data hub. In embodiments, it is suitable to represent the data hub using a Context-Sensitive Knowledge Graph, wherein various analytics algorithms can be implemented.

The data hub may include a variety of user interface options, including custom built-in utilities (e.g., atRiskCrop( ), stressedCrops( ), lowpHArea( )) on top of the data hub, which can be accessed through APIs and whose return values can be displayed on an interactive dashboard to be consumed by targeted end-users (e.g., farmers, aggregators, domain experts, etc).

In embodiments, the contents of the data hub are accessed by the farm profile generator, and the resulting output is an individualized farm profile. The farm profile is based on information such as any of the following, in any combination: soil type, demography, area, topography, crop history, water source, current crop type, fertilizer history, current fertilizer, farm tools availability, weather history (precipitation, temperature, etc.), farmer profile, digital landmark, picture(s), and the like. In embodiments, the farm profile generator constructs farm profiles/identities by combining basic information (crop type, water source, farmer profile, etc.) with advanced information (digital landmark, pictures, etc.) pertaining to the farm.

The farm profile includes a unique farm digital identity (FDI) for the farm, wherein the FDI is derived using text analytics and/or image (e.g., mobile phone images, satellite images, flying drone images) analytics on the sensor and non-sensor data pertaining to the farm. In embodiments, the aggregator & linker module, as well as other modules, use the FDI to organize stored and incoming sensor and non-sensor data such that the data is properly assigned to the appropriate farm, particularly over a period of time. Furthermore, the various modules and users of the system can access and monitor farms and farm data based on their FDI, such as on the I/O devices described herein (monitors, dashboards, etc.).

In embodiments, a farmer profile is an additional factor that can be used in the methods herein to further refine the farm profile. The farmer profile is a profile specific to an individual farmer relevant to a farm—e.g., the owner of the farm, the farm manager, or the like. A farmer profile can be created based on various information about the farmer and the farm to which the farmer is associated, e.g. bio-data, demography, education level, age, gender, farmer network, experience, training, and the like. In embodiments, the farmer profile is provided to the data hub and is then accessed by the farm profile generator just as any other data in the data hub is accessed. In alternative embodiments the farmer profile is stored separately from the data hub (e.g., for data privacy or the like) but can be accessed by the system (e.g., the server and a component thereof, such as the farm profile generator or other components). In embodiments, the system includes an input module that allows a farmer to input a farmer profile or other data (e.g., data relevant to the farm profile, crop data, etc.). The input module can be on a user device such as a mobile device, or can be located at the server such that an operator is able to input the farmer profile or other data.

Various ranking and similarity algorithms can be applied to rank individual crops or farms based on, e.g., predicted productivity, aggregated crop water deficit; cluster farms based on farm similarities, water consumption, crop health, etc. These values are determined based on the contents of the data hub and the determined farm profiles, and such determinations are described below.

The farm profile and data from the data hub are together accessed by a crop water deficiency analyser module in determination of the crop water deficiency index (D). The value of D is an estimated water value required by a crop before the crop falls under a water stress situation, and is based on the current and ongoing water consumption patterns, predicted consumption, and other contextual/environmental factors. The term $D_{min}$ indicates minimized crop water deficiency, meaning that a particular crop is under minimum water pressure—i.e., the crop is not at risk of failure due to lack of water. From various determined and predicted values of D, including $D_{min}$, the system can determine descriptive and predictive models to provide immediate insights about crop stress patterns. For example, predictive models for Crop Deficit D can be determined as a function of crop water log patterns (using the streaming and historical soil moisture data and crop growth models) and context analysis. In an embodiment, the context analysis uses existing data-sources such as farm inventory, crop evapotranspiration and growth databases and other information such as market data from a market information system.

Crop Water Deficit (D) is a function of soil moisture, irrigation water and precipitation. Assuming that crop water uptake pattern is inferred from the soil moisture readings, the Crop Water Deficit for Crop i ($C_i$) for a given day d is defined as:

$$D_{C_i}(d) = ETc(d) - W_{up}(d) \quad (1)$$

$$W_{up}(d) = SM_{t2}(d) - SM_{t1}(d) \quad (2)$$

where ETc is $C_i$'s evapotranspiration, $SM_{t1}$ is the moisture present in the soil just after irrigation or precipitation, $SM_{t2}$ is the moisture present in the soil at the end of the day, and their difference is approximately the crop's water uptake during that day. These variables are assumed for a given crop $C_i$. $SM_{t2}$ is further defined as:

$$SM_{t2}(d) = Pr(d) + I(d) \quad (3)$$

where Pr is the precipitation for the day d and I is irrigation applied as a function of R. Therefore:

$$D_{C_i}(d) = ETc(d) - (Pr(d) + I(d)) + SM_{t2}(d) \quad (4)$$

A farm typically contains at least one water point, and may contain more than one water point. A water point may be a water tank, borehole, lake, or other water supply point for a farm. The water point may be an irrigation node for the farm. The water point analyzer module resides on the server and uses the generated farm profile in order to determine a water point reliability index (R). The value of R is a computed value that informs how a water point is reliable to supply the required water based on the farm-level aggregated D requirements using historic water supply data, past reliability pattern of that water point, current water status, etc. The value of $R_{max}$ indicates maximized water point reliability—i.e., the water point is sufficiently reliable that water needs are likely to be met. More formally, the Water Point Reliability R can be defined as the ratio between a water point's available water ($W_a$) and consumed water ($W_c$):

$$R = \frac{Wa}{Wc} \tag{5}$$

It can be assumed that for a given discrete time interval, $W_c$ may be equivalent to the water uptake measured by the soil moisture sensors ($W_{up}$). $W_a$ is the amount of water available from the water point at the beginning of said time interval. Therefore, the reliability R(d) over an interval oft discrete time steps can be modelled as:

$$R(d) = \frac{1}{t}\int_0^t \frac{W_a}{W_{up}} dt \tag{6}$$

In embodiments, the methods involve determining a Crop Health Index (H). The value of H is representative of the overall conditions of a crop based on R, D, and contextual/environmental conditions from other plurality of data sources such as weather and satellite data, all pertaining to a particular crop on a particular farm. The value $H_{max}$ indicates maximized crop health.

To determine H, in embodiments, the system uses collected real time data on crop water uptake patterns, for example using soil moisture sensors (e.g., a maximum frequency f that can be adjusted based on context) and water consumption and supply data. Furthermore, the system can aggregate crop water uptake data, and crop context data (e.g., using weather and satellite data) to determine a crop health score. In embodiment, the system computes a crop health score H using variations in soil moisture patterns and farm input data sources. In embodiments, the Crop Health Score H is determined per crop using localized supervised metric learning since similar crops can be in grown in different regions with different environmental conditions.

H is calculated as a function of D, Farm Input Index (FI) and Crop Sensitivity (CS)—i.e., $$H = f(D, FI, CS) \tag{7}$$

where FI is computed from qualitative values extracted from the cohorts of pesticide, herbicide, fungicide, fertilizer application, water use as well as the farmer cohort. The farmer cohort may make use of farmer historical activity logs (e.g., number of activities completed to take action on preventive measures). CS is the Crop Sensitivity and is dependent on weather variables such as temperature, rainfall, light intensity, etc. By making simplifying assumptions concerning the nature of plant health, we can model $H_{C_i}$ for a day d as:

$$H_{C_i}(d) = \alpha e^{-\beta D(d)} \tag{8}$$

where $\alpha$ is a coefficient that takes into account Fi and $\beta$ is a coefficient that takes into account Sc. These coefficients could be reversed.

In embodiments, the crop H and farm status are used to compute the irrigation water requirements per farm size. Crop health provides a more nuanced view of the plant's status and need for water than merely relying on raw soil moisture signals. This is particularly important for resource constrained arid regions with limited available water.

In embodiments, a first plant health assessment is generated based on a first grouping of moisture measurements and related context data, the first moisture measurement grouping reflecting a stress level of a plant in a plot of soil. This allows calculation of a first crop health score, which first crop health score is then stored in system memory. A second plant health assessment is generated based on a second grouping of moisture measurements. The method then involves comparing the second score to the first score and to the target score established for that type of plant in that environment. Based on the comparison, water addition is triggered as needed to re-establish target crop health score.

In embodiments, a Farm Productivity Predictor Index (P) is determined. P is a function of Water Point Reliability R and Crop Health Index (H) as discussed above. The value of P is a predictor of how a farm is promising to produce crops (i.e., crop production) as a function of time, quality, and quantity using functions of the crop health and current water indexes and other data sources (e.g., crop databases, weather, etc). The crop health score, current water index and other data sources (e.g., crop databases, weather, etc) inform on quality and quantity in the calculation of P. Mathematically, P may be defined as:

$$P = P_{max} - L(t_H) \tag{9}$$

where $P_{max}$ is the maximum expected crop productivity computed during farm planning period and L (tH) (the productivity loss at time of harvest, tH) is given by:

$$L(tH) = \sum_{i=0}^{M-1} k_i f(H_{C_i}(t_H - M + 1 + i)) \tag{10}$$

where $H_{C_i}$(tH−M+1+i) (the crop health on a given day i in a season with M days) is given by equation above. For each day i, there exists a coefficient $k_i$ that represents how the impact the plants current health will have on eventual yield. Equation 10 can be extended to days that that have not yet observed. It is quite similar in form with Equation 9, with the exception that most input variables are approximated by either statistical or physical models.

$$\hat{P} = P_{max} - \hat{L}(tH) \tag{11}$$

$$\hat{L}(tH) = \sum_{i=0}^{M-1} k_i f(\hat{H}_{C_i}(tH - M + 1 + i)) \tag{12}$$

$$\hat{H}_{C_i}(d) = \alpha e^{-\beta \hat{D}(d)}. \tag{13}$$

In embodiments, a market information tracking module helps to further inform how projected farm outputs from an individual farm compare to production in the area/region, and therefore help to predict the projected economic output and viability of a farm.

In embodiments, given the maximum productivity for a given soil type or soil condition, at each time step, the system uses probabilistic algorithms to assess and generate the productivity index P (e.g., how much good quality produce is likely). In embodiments, the probabilistic models further infer from prior growing conditions—as indicated by the Crop Health Index. In embodiments, the crop health score is inferred from patterns in the soil moisture signals. Each crop group has known, optimal soil moisture signals.

Abnormalities in the signal mean crop health has been reduced in some way, and this affects the calculation of H.

In embodiments, an output of the system is an intervention plan. The intervention plan is created by an intervention generator, and involves/includes a variety of steps that are recommended, are automatically implemented, or are sent to other systems for further evaluation. Steps added to an intervention plan are compared with known models that are relevant to the farm type and other contextual indicators.

For example, based on the results/value of P (e.g., if P is below the expected crop productivity), the intervention generator produces an optimal intervention strategy to maximize P, by enabling or communicating with services or systems. The intervention generator may be configured and may include, for example, instructions for irrigation, fertilization, crop planting, crop harvesting, etc., which instructions may be for: automated implementation/initiation by devices in communication with the server via a network; altering an output device such as a mobile device, sensors, actuators (e.g. pumps valves, automated irrigation systems), PC, etc. in the form of a user interface, display, etc. with written instructions, information, images or alerts (verbal and/or visual); altering an output on said devices in the form of a user interface, display, etc. to provide an interactive dialog in order to obtain further information; and the like. Examples of services or systems that may be automatically initiated as a part of an intervention plan include those described below as well as others that are standard in agriculture.

An irrigation scheduler system may be automatically initiated by the system, so as to increase or decrease the amount of irrigation occurring on a farm. The irrigation scheduler is typically accessible from a data network or other network and communication from the server is configured to activate the irrigation scheduler and provide a suitable irrigation schedule in the form of machine readable instructions. The suitable irrigation schedule is based, for example, on the farm profile and the values of D, H, and/or P, and is configured to maximize crop health and farm output via appropriate watering of crops on the farm. In alternative embodiments, an irrigation scheduler is manually altered (e.g., by a farmer setting timers or other components of the scheduler) based on instructions received by the farmer from the system (e.g., instructions received by a user device such as via SMS, email, or the like).

In embodiments, the output of the system includes automatically initiating an alert system or provides automated notifications to various persons—farmers, water utility officials in charge of water supply pipes and the like, etc. Such automated alerts may be, for example, notifications that automatically appear on user interfaces, dashboards, displays, etc. as audio or visual or audio visual messages on mobile/sensor devices, actuators (e.g. pumps valves, automated irrigation systems), desktop computer, etc. The alerts may include instructions for rectifying an undesirable or non-ideal situation pertaining to crop health (e.g., insufficient water supplied to crops, etc.), instruction for increasing a water supply (e.g., a water tank level is low and requires topping up), etc.

In embodiments, a user interface is present in the system, either for an operator (wherein the user interface is for the server) or for a farmer (wherein the user interface is for a user device such as a mobile device), or both. The user interface receives instructions from the system based on the intervention plan (and therefore based on the calculated values D, H, and/or P). The instructions may include, for example, instructions for altering the user interface (e.g., a display, dashboard, interactive audio component, etc.) to provide alerts, instructions, or an interactive dialog system. An interactive dialog system is a platform by which the system can provide tailored instructions to a user and receive more information from the user about the user or about the farm or context. For example, the dialog system can request more specific instantaneous weather conditions at the farm, or information about the success or failure of crops in the region (e.g., within a given radius around the user's crops).

With reference to FIG. 1, there is provided a flowchart showing collection of data and formation of a data hub according to an embodiment of the invention. Sensory data 100 is gathered and managed by sensory data engine 110. Non-sensory data 200 is gathered and managed by non-sensory data engine 210. The sensory and non-sensory data from these engines are processed by feature extraction module 300, and the processed data is delivered and stored in data hub 500. In some embodiments (not shown in the figure) sensory data and non-sensory data may be delivered directly to data hub 500 without processing by feature extraction module 300. Also delivered to data hub 500 is farmer profile 250. Data hub 500 is in communication with farm profile generator 600 and crop water deficiency analyser 700, and these modules use the data from data hub 500 in order to generate a farm profile and produce a crop water deficiency index D.

Figure 2:
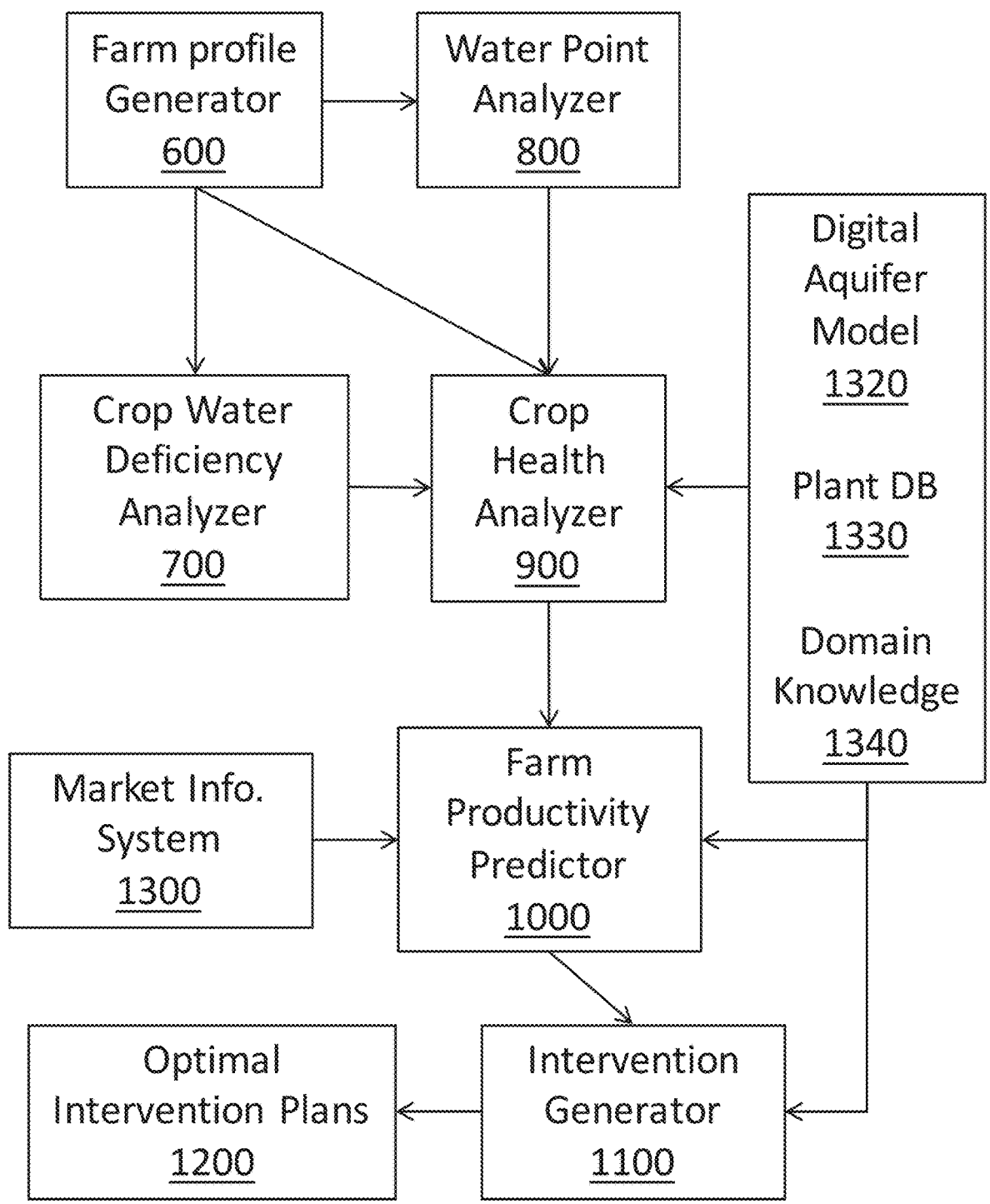
FIG. 2 provides a flowchart showing use of data to develop an intervention plan according to an embodiment of the invention.

With reference to FIG. 2 there is provided a flowchart showing use of data to develop an intervention plan according to an embodiment of the invention. The farm profile from the farm profile generator 600 is used by water point analyser 800 to determine a water point reliability index R. The water point reliability index R and the crop water deficiency index D (from crop water deficiency analyser 700) are used by crop health analyser 900 to produce a crop health index H. Other information provided in the determination of H includes digital aquifer model 1320, plant database 1330, and domain knowledge 1340, any of which may be supplied from an external source or may be stored in the server. These data are, along with H and along with market information from market information system 1300, are used by farm productivity predictor 1000 in order to determine farm productivity predictor index P. The data is also used, along with P, by intervention generator 1100 to generate optimal intervention plans 1200. The intervention plans 1200 are then output according to the specification.

Figure 3:
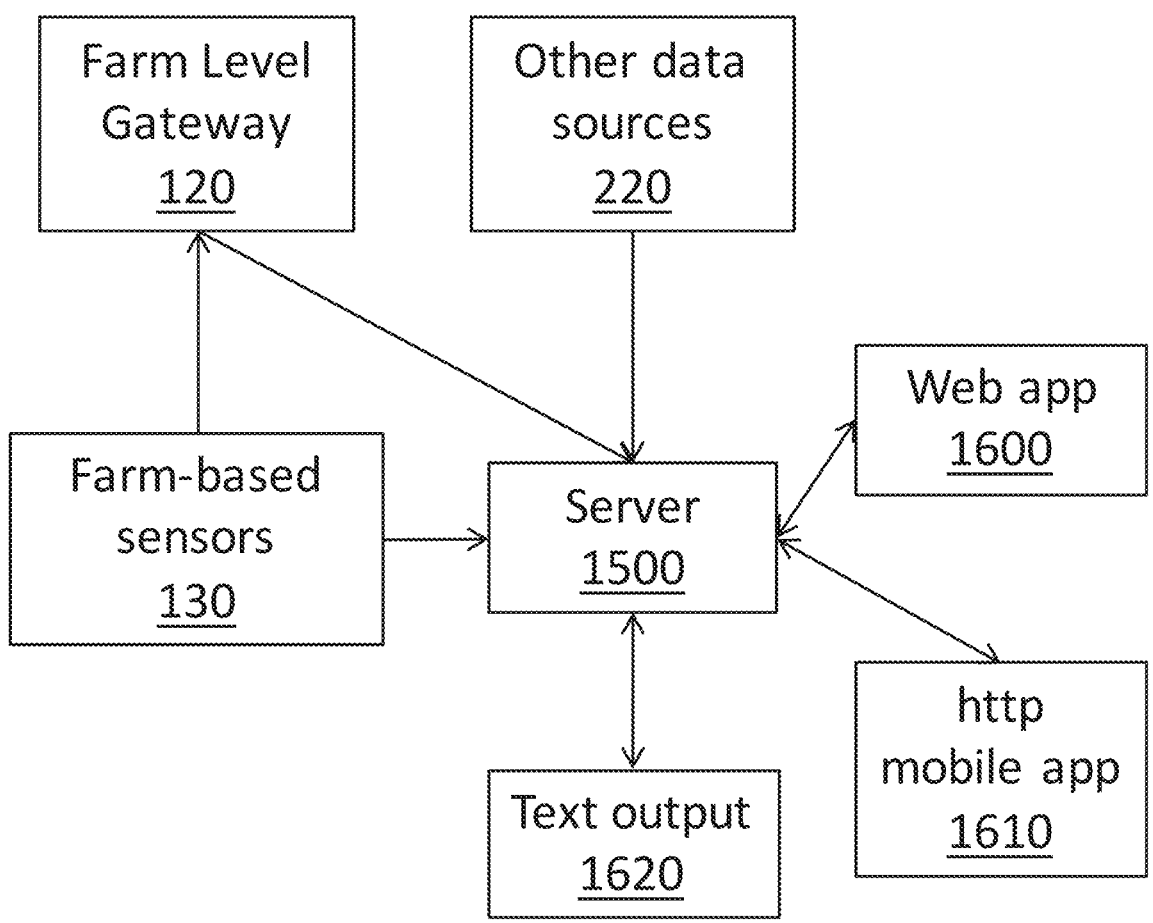
FIG. 3 provides a flowchart showing an overall architecture of devices and data flow according to an embodiment of the invention.

FIG. 3 provides a flowchart showing an overall architecture of devices and data flow according to an embodiment of the invention. Farm-based sensors 130 (e.g., WLS and SMS) communicate with server 1500 either directly or via farm level gateway 120 (both connections are shown although in practice both or only one may be present in any specific embodiment). Other data from other data sources 220, such as weather reports, satellite imagery, plant databases, and the like, are also communicated to server 1500. Server 1500 contains (not shown) a number of modules implemented as machine readable instructions and data storage, including a data hub, a farm profile generator, a crop water deficiency analyser, a water point analyser, a crop health analyser, a farm productivity predictor, and an intervention generator, as well as others as appropriate. Based on the generated intervention plan(s), server 1500 initiates one or more of various output such as altering the display and/or user interface on a web application 1600, or altering the display and/or user interface on an http mobile application 1610, and/or sending textual output 1620 to a mobile device. These output may include an interactive component such that the intervention plan can be modified as needed based on further input from a user.

Certain components of the system are either not mentioned herein or are mentioned only briefly, primarily because such components are self-evident and/or self-explanatory to one of ordinary skill in the art. For example, the system contains communications components (enabling the system to carry out the various communications operations mentioned herein), data transfer components, I/O devices, and similar components that are not described herein in detail for the sake of brevity.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. It will further be understood that the equations provided in this disclosure are representative and that alternative models may be used. The pertinent parts of all publications mentioned herein are incorporated by reference. All combinations of the embodiments described herein are intended to be part of the invention, as if such combinations had been laboriously set forth in this disclosure.

EXAMPLES

Example 1

Consider two small scale farms at a given location X and Y growing tomatoes in a one-acre plot and instrumented with soil moisture sensors located at positions shown below and water level sensor located at an irrigation tank.

For both areas, the following parameters may vary: weather conditions, soil type, water consumption at the farm, and farmer's profile. Moreover, we assume that the following parameters are similar: type of crop variety (say both farms are using Tilka F1 tomato variety), type of irrigation system and water tank size.

Due to the variation of values for the dynamic parameters (i.e., soil type and weather), the crop water uptake patterns indicated by the soil moisture readings will be different in both locations hence the Crop Health Index H. This is because that H depends on the value of the Crop Water Deficit D that depends on the Crop Water needs estimated using ETo which is a function of weather variables. In addition, given the farmer behaviour, application of fertilizer, watering etc will be different in the two locations. Hence the overall farm productivity P may vary for the two locations.

TABLE 1

Example of proof-of-concept values for H, D, and P using experimental data.

| Variables for Tomato in Flowering Stage | Farm X Location X (Lat long Altitude) | Farm Y Location Y (Lat long Altitude) | Farm Z |
|---|---|---|---|
| Weather Variables (Average) | | | |
| Temperature (deg Celcius) | 26 | 27 | 28 |
| Rainfall (mm) | 3.42 | 4.65 | 2.45 |
| Wind Speed (mph) | 8 | 4 | 6 |
| Solar Irradiation (W) | 10 | 12 | 15 |
| Solar Irradiance | | | |
| Soil moisture | 40 | 55% | 80% |
| Soil Type | Sandy Clay loam | Sandy Loam | Loam |
| Water Consumption Pattern | | | |
| Water Point Reliability | 0.2 | 0.5 | 0.4 |
| Irrigation time (hrs) | 0600-0800 | 1100-1400 | 1600-2000 |
| Farmer Profile | | | |
| Performance | High | Poor | High |
| Variety | | | |
| Average ETo | Tilka F1 | Tilka F1 | Tilka F1 |
| Irrigation System | | | |
| Type | Drip | Drip | Drip |
| Tank Capacity(Litres) | 5000 | 5000 | 5000 |
| Crop Water Deficit (D) | 0.6 | 0.4 | 0.2 |
| Crop Health Index (H) | 0.7 | 0.4 | 0.6 |
| Farm Productivity (P) | 0.7 | 0.5 | 0.6 |

Example 2

Figure 4:
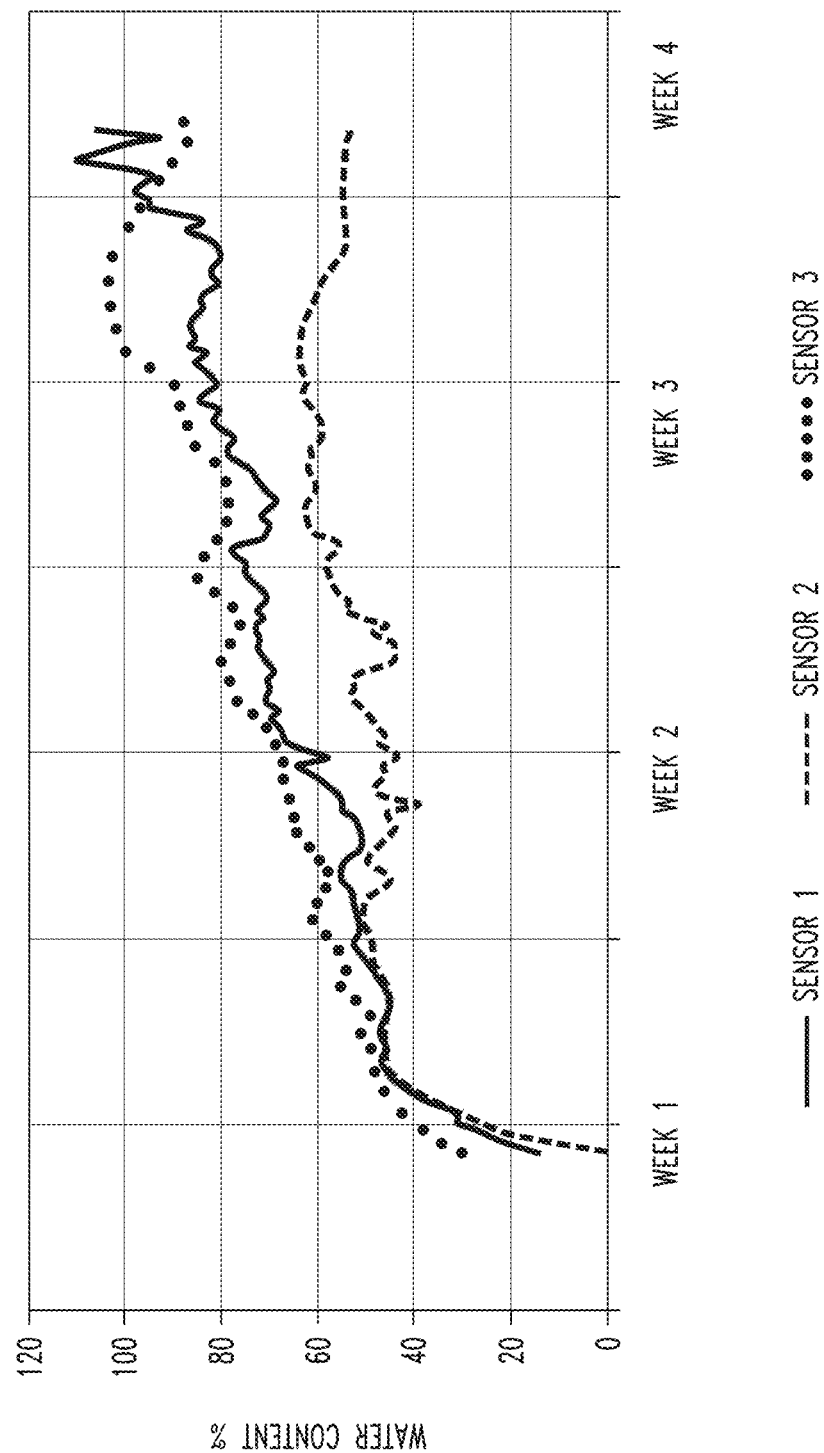
FIG. 4 provides a graph of water content v. time (date) for sensors monitoring plant growth in soil.

Soil moisture signals collected from bush beans grown in the same container, with the same soil type, under different watering conditions reflect distinct fluctuations that link to the water uptake patterns and plant health. The micro and macro patterns embedded in the signals reflect the level of water stress being experienced by the beans. A graph of water content over time from three sensors monitoring the growth of the beans is shown in FIG. 4.

The invention claimed is:

1. A method for managing crop production, the method comprising:
receiving water sensor data from a water sensor pertaining to a water level at a location and soil sensor data from a soil sensor pertaining to a soil condition at the location;
determining a water point reliability index (R(d)) for the location from a data hub, the data hub comprising the water sensor data, the soil sensor data, a profile characterizing one or more personal capabilities of a farmer at the location, and context data, the water point reliability index (R(d)) being defined as a ratio between an amount of available water (Wa) and an amount of consumed water (Wup) measured by soil moisture sensors, the one or more personal capabilities comprising at least one of an education level of the farmer, experience level of the farmer, a skill set of the farmer, and a training level of the farmer;
determining a crop health index for the location from the data hub;
determining a productivity index for the location from the data hub;
determining an intervention plan, the intervention plan comprising an automated irrigation scheduler, based on the water point reliability index, crop health index, the profile, and productivity index; and
initiating the intervention plan, the initiating comprising initiating the automated irrigation scheduler at the location to activate an irrigation system.

2. The method of claim 1, wherein the location is a farm, the water sensor data corresponds to a water level in a water storage tank, and the soil sensor data corresponds to a soil moisture level.

3. The method of claim 1, further comprising receiving the profile, and aggregating the received data to form the data hub.

4. The method of claim 1, further comprising receiving non-sensory data pertaining to the location or to the farmer.

5. The method of claim 1, wherein the intervention plan is selected to maximize the productivity index.

6. The method of claim 1, wherein the intervention plan comprises a crop yield prediction, and the action is selected based on the crop yield prediction.

7. The method of claim 1, wherein the data hub further comprises a plurality of plant health indices, each plant health index pertaining to an individual plant, and wherein the crop health index is based on the plurality of plant health indices.

8. The method of claim 1, wherein the data hub further comprises a plurality of plant health indices, and wherein the plurality of plant health indices are calculated from the soil sensor data in the data hub and each plant health index pertains to an individual crop.

9. The method of claim 1, wherein the data hub further comprises soil sensor data pertaining to a second location adjacent to the location.

10. The method of claim 1, wherein data hub further comprises data pertaining to the location, the data comprising soil type, soil pH, crop history, elevation, and GPS coordinates.

11. The method of claim 1, wherein the water point reliability index (R(d)) is defined by $$R(d) = \frac{1}{t}\int_0^t \frac{Wa}{Wup} dt.$$

12. A system comprising:
a processor; and
a memory coupled to the processor, the memory configured to store program instructions for instructing the processor to perform operations comprising:
receiving water sensor data from a water sensor pertaining to a water level at a location and soil sensor data from a soil sensor pertaining to a soil condition at the location;
determining a water point reliability index (R(d)) for the location from a data hub, the data hub comprising the water sensor data, the soil sensor data, a profile characterizing one or more personal capabilities of a farmer at the location, and context data, the water point reliability index (R(d)) being defined as a ratio between an amount of available water (Wa) and an amount of consumed water (Wup) measured by soil moisture sensors, the one or more personal capabilities comprising at least one of an education level of the farmer, experience level of the farmer, a skill set of the farmer, and a training level of the farmer;
determining a crop health index for the location from the data hub;
determining a productivity index for the location from the data hub;
determining an intervention plan, the intervention plan comprising an automated irrigation scheduler, based on the water point reliability index, crop health index, the profile, and productivity index;
initiating the intervention plan, the initiating comprising initiating the automated irrigation scheduler at the location to activate an irrigation system.

13. The system of claim 12, further comprising a communication component configured to receive the data from the water sensor and the soil sensor.

14. The system of claim 12, wherein the processor is configured to communicate with the water sensor and soil sensor via a network.

15. The method of claim 12, wherein the water point reliability index (R(d)) is defined by $$R(d) = \frac{1}{t}\int_0^t \frac{Wa}{Wup} dt.$$

16. A method for managing crop production, the method comprising:
receiving, by a server, water sensor data from a water sensor at a location, and storing the water sensor data in a data hub;
receiving, by the server, soil sensor data from a soil sensor at the location and storing the soil sensor data in the data hub;
receiving, by the server, a profile characterizing one or more personal capabilities of a farmer associated with the location, and storing the profile in the data hub, the one or more personal capabilities comprising at least one of an education level of the farmer, experience level of the farmer, a skill set of the farmer, and a training level of the farmer;
determining, based on the contents of the data hub, a water point reliability index (R(d)) and a crop health index for the location, the water point reliability index (R(d)) being defined as a ratio between an amount of available water (Wa) and an amount of consumed water (Wup) measured by soil moisture sensors;

determining a productivity index based on the water point reliability index and the crop health index;

determining and initiating an action based on the productivity index, the action comprising initiating an automated dispensing device at the location to activate an irrigation system.

17. The method of claim 16, wherein the action is a component of an intervention plan, the intervention plan comprising a plurality of action.

18. The method of claim 16, further comprising receiving plant identification data and storing the plant identification data in the data hub, and further comprising determining a plurality of plant health indices from the soil sensor data, the plant identification data and context data.

19. The method of claim 16, further comprising predicting an event pertaining to the location based on the data hub, wherein the event is predicted to affect a future productivity index for the location, and wherein the action is determined based on the predicted event.

20. The method of claim 16, wherein the water point reliability index (R(d)) is defined by $$R(d) = \frac{1}{t}\int_0^t \frac{Wa}{Wup} dt.$$

21. A system comprising:
a processor; and
a memory coupled to the processor, the memory configured to store program instructions for instructing the processor to perform operations comprising:
receiving, by a server, water sensor data from a water sensor at a location, and
storing the water sensor data in a data hub;
receiving, by the server, soil sensor data from a soil sensor at the location and storing the soil sensor data in the data hub;
receiving, by the server, a profile characterizing one or more personal capabilities of a farmer associated with the location, and storing the profile in the data hub, the one or more personal capabilities comprising at least one of an education level of the farmer, experience level of the farmer, a skill set of the farmer, and a training level of the farmer;
determining, based on the contents of the data hub, a water point reliability index (R(d)) and a crop health index for the location, the water point reliability index (R(d)) being defined as a ratio between an amount of available water (Wa) and an amount of consumed water (Wup) measured by soil moisture sensors;
determining a productivity index based on the water point reliability index and the crop health index;
determining and initiating an action based on the productivity index, the action comprising initiating an automated dispensing device at the location to activate an irrigation system.

22. The method of claim 21, wherein the water point reliability index (R(d)) is defined by $$R(d) = \frac{1}{t}\int_0^t \frac{Wa}{Wup} dt.$$

23. A method for managing crop production at a farm, the method comprising:
receiving water sensor data from a water sensor and soil sensor data from a soil sensor;
determining, by a server, based on a profile characterizing one or more personal capabilities of a farmer at the location and real time farm-level sensory data pertaining to soil moisture and water point reliability index (R(d)), an intervention plan for improving productivity and crop health at the farm, the one or more personal capabilities comprising at least one of an education level of the farmer, experience level of the farmer, a skill set of the farmer, and a training level of the farmer, the water point reliability index (R(d)) being defined as a ratio between an amount of available water (Wa) and an amount of consumed water (Wup) measured by soil moisture sensors;
implementing, by the server, the intervention plan, wherein the intervention plan comprises initiating an automated irrigation scheduler at the farm to activate an irrigation system.

24. The method of claim 23, wherein the water point reliability index (R(d)) is defined by $$R(d) = \frac{1}{t}\int_0^t \frac{Wa}{Wup} dt.$$

* * * * *